June 2, 1925.
E. L. FORD
VENTILATOR FOR PASSENGER VEHICLES
Filed Sept. 11, 1922
1,539,998
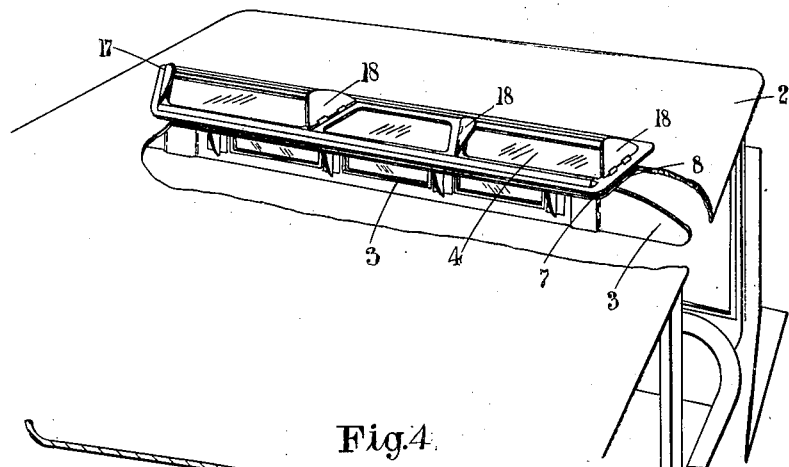
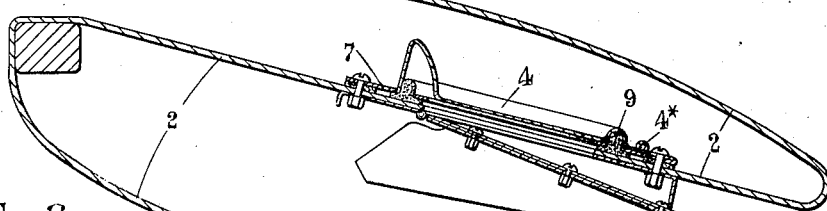
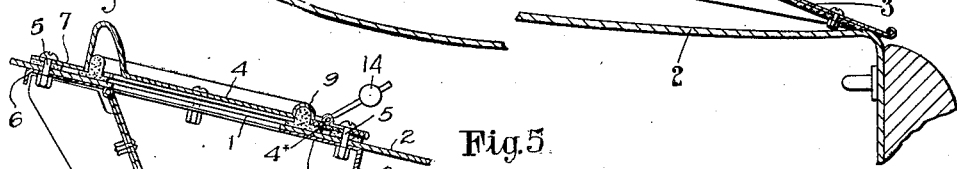
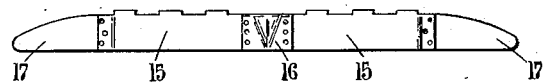
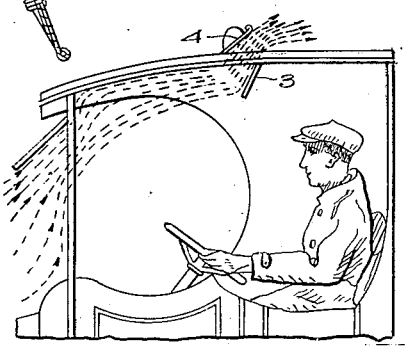
INVENTOR
Ernest Leonard Ford
per Robert E. Phillips
Attorney Patented June 2, 1925.

1,539,998

UNITED STATES PATENT OFFICE.

ERNEST LEONARD FORD, OF DARLINGTON, ENGLAND.

VENTILATOR FOR PASSENGER VEHICLES.

Application filed September 11, 1922. Serial No. 587,486.

*To all whom it may concern:*

Be it known that I, ERNEST LEONARD FORD, a subject of the King of Great Britain and Ireland, residing at Honeypot Works, Honeypot Lane, Darlington, in the county of Durham, England, have invented certain new and useful Improvements in Ventilators for Passenger Vehicles, of which the following is a specification.

This invention relates to ventilators for passenger vehicles of the closed or partially closed type and has for its object to eliminate back draught created by the forward movement of the vehicle. A further object of the invention is to so construct the ventilator that when applied to a folding hood it can be folded or partly folded so as to facilitate the folding of the hood and not materially increase the bulk of same when folded.

I attain this end by the device illustrated in the accompanying drawings in which:

Fig. 1 is a diagrammatic view indicating how the air current passing through an open wind screen is deflected by the use of the present invention.

Fig. 2 is a view in cross section of the device,

Fig. 3 is a view in perspective showing the application of the device and a modification of the valve.

Fig. 4 is a broken view showing how the device can be folded when applied to the roof of a folding hood, and Figs. 5 and 6 are views in elevation and plan showing a modification of the deflector.

Throughout the views similar parts are marked with like numerals of reference.

The device comprises an apertured frame 7 adapted to register with an aperture 1 in the roof 2 of the vehicle—which expression is intended to include a hood or a cover—a deflector 3 which consists of a plate secured to the under side of the roof adjacent to the rear edge of the apertured frame 7 arranged to slope downwards in a forward direction, and a flap valve 4 pivoted at 4\* on the exterior of the roof at the front edge of the apertured plate or frame and adapted to close the aperture in the roof. The deflector 3, and the valve 4 are mounted on the roof in any suitable manner, a suitable construction is to make the foundation frame of two plates 7 and 8 adapted to be secured together and to the upper and under surface of the roof respectively by bolts 5 and to mount the valve on the upper plate 7 of said frame and the deflector on the under plate 8 of said frame the apertures in the plates being adapted to register with one another and with the aperture in the roof. To stiffen the plates 7 and 8 when used in conjunction with a flexible roof both of said plates may be stiffened transversely by the use of flanges 6. To ensure the silent closing of the valve and to render same water-tight a strip 9 of rubber or other suitable material is mounted in the upper plate 7.

To facilitate the opening of the valve under a minimum of pressure it may be fitted with a counter balance weight 14.

The ventilator may either be formed of a single valve and a single deflector or of a plurality of valves and deflectors as shown in Figure 3. When the ventilator is intended to be fitted to a hood or other flexible covering it is preferably formed in a plurality of sections as shown in Figures 5 and 6 so as to enable it to conform to the configuration of the hood, the two main sections 15 and 15 being connected to one another by a piece of any flexible material 16 and each carrying a shaped end plate 17.

To prevent the valve from opening or being kept open by a back or following wind side vanes 18 are mounted on the exterior of the valve at the sides thereof said vanes consisting of angularly arranged plates which incline towards the valve. The action of a current of air from the rear or sides on said vanes creates a downward pressure on the valve which prevents it from being lifted or opened by such currents of air.

When the ventilator is to be fitted to the flexible roof of a folding hood or the like the deflector and the vanes when such are employed are hinged so as to enable them to be folded to lie in close proximity to one another and to the hood when it is folded as shown in Fig. 4.

What I claim is:—

1. A ventilator for closed or partially closed vehicles, comprising a frame adapted to encircle an aperture in the roof of the vehicle, a flap valve pivoted to the front of said frame in advance of the aperture therein, a deflector depending from the underside of said frame from the back edge of the aperture therein and co-acting with said valve so that the current of air caught by said deflector will cause it to open the aperture in the roof automatically when the vehicle is moving in a forward direction.

2. An automatic ventilator for closed or partially closed bodies of vehicles, comprising a foundation frame adapted to encircle an aperture in the roof of the vehicle, a deflector plate hinged to the underside of said frame at the rear of the aperture therein and sloping forward, and a flap valve hinged to the upper side of said frame at the forward edge of the aperture in said frame.

3. An automatic ventilator for the closed or partially closed bodies of vehicles, comprising a frame consisting of two apertured plates adapted to be fixed to the roof of the vehicle and register with an aperture in same one on the upper and the other on the underside of said roof, a deflector or plate hinged to the under of said plates at the rear edge of the aperture therein, and a flap valve pivoted to the upper of said plates and adapted to close the aperture in said frame.

4. An automatic ventilator for the closed or partially closed bodies of vehicles comprising an apertured frame adapted to be fixed to the roof of the body of the vehicle and register with an aperture therein, a flap valve hinged to the upper side of said apertured plate at its forward edge of the aperture therein, a deflector on the underside of said plate at the rear edge of the aperture in same, said deflector being made in sections to enable same to conform to the curvature of the roof of the vehicle.

5. An automatic ventilator for the closed or partially closed bodies of vehicles comprising an apertured frame adapted to be fixed to the roof of the body of the vehicle and register with an aperture therein, a deflector formed in two parts with a connecting piece of flexible material between them said deflector being mounted on the underside of the apertured frame at the rear edge of the aperture in same, and a flap valve hinged to the upper side of the apertued frame at the forward edge of the aperture therein.

6. In a closed or partially closed body for vehicles an automatic ventilator comprising two apertured plates adapted to be fixed together and to the roof of the body of the vehicle so as to register with an aperture therein, a deflector hinged to the under plate at the rear edge of the aperture in same, a stop to retain said deflector in an inclined position, a flap valve hinged to the upper plate at the forward edge of the aperture therein, and a resilient facing for the aperture in the upper plate.

7. In a closed or partially closed body for vehicles an apertured frame adapted to be fixed to the roof of the vehicle and register with an aperture therein, a deflector hinged to the underside of said frame at the rear edge thereof, a flap valve hinged to the upper side of said frame at the forward edge of the aperture therein, a counter weight to balance the weight of said valve, means for locking said valve in its closed position and a plate or shield mounted on the apertured frame on each side of the flap valve.

ERNEST LEONARD FORD.